United States Patent
Wichmann

(12) 
(10) Patent No.: US 11,099,316 B1
(45) Date of Patent: Aug. 24, 2021

(54) LIGHT ASSEMBLY WITH A MULTI-BRANCHED LIGHT GUIDE DEVICE

(71) Applicant: VARROC LIGHTING SYSTEMS, s.r.o., Šenov u Nového Jičína (CZ)

(72) Inventor: Steve Wichmann, Saline, MI (US)

(73) Assignee: VARROC LIGHTING SYSTEMS, S.R.O., Senov U Noveho Jicina (CZ)

( * ) Notice: Subject to any disclaimer, the term of this patent is extended or adjusted under 35 U.S.C. 154(b) by 0 days.

(21) Appl. No.: 16/825,497

(22) Filed: Mar. 20, 2020

(51) Int. Cl.
G02B 6/00 (2006.01)
F21V 8/00 (2006.01)
F21V 3/00 (2015.01)

(52) U.S. Cl.
CPC .............. G02B 6/0075 (2013.01); *F21V 3/00* (2013.01); *G02B 6/0005* (2013.01)

(58) Field of Classification Search
CPC .. G02B 6/0075; G02B 6/0066; G02B 6/0005; G02B 6/02; G02B 27/0994; G02B 6/0016; F21V 3/00
See application file for complete search history.

(56) References Cited

U.S. PATENT DOCUMENTS

| 4,280,751 A | 7/1981 | Divita |
| 6,139,176 A * | 10/2000 | Hulse .................. B60Q 3/66 362/581 |
| 7,113,684 B1 * | 9/2006 | Cianciotto ........... G02B 6/0066 362/551 |
| 2002/0102058 A1 * | 8/2002 | Hulse .................. G02B 6/0005 362/551 |
| 2015/0023047 A1 | 1/2015 | Hori |
| 2017/0261168 A1 | 9/2017 | Edletzberger et al. |

FOREIGN PATENT DOCUMENTS

| JP | 5410658 B2 | 11/2013 |
| JP | 2014007014 A | 1/2014 |
| JP | 2015204275 A | 11/2015 |
| JP | 6521686 B2 | 5/2019 |

* cited by examiner

*Primary Examiner* — Y M. Quach Lee
(74) *Attorney, Agent, or Firm* — Cantor Colburn LLP

(57) ABSTRACT

A multi-branched light guide device for a light assembly includes first, second, and third braches each adapted to internally transmit respective portions of a plurality of lights rays along respective directions. The branches each include a respective outer surface adapted to internally reflect the respective portions in the respective directions. A trunk of the device is connected to the branches, and is adapted to internally transmit the plurality of light rays against the outer surfaces of the branches.

10 Claims, 3 Drawing Sheets

LIGHT ASSEMBLY WITH A MULTI-BRANCHED LIGHT GUIDE DEVICE

INTRODUCTION

The subject disclosure relates to a light assembly, and more particularly, to a light assembly having a multi-branched light guide device.

Light assemblies typically include a substantially closed housing that defines a chamber. In some examples, a light source in the chamber is adapted to direct light through a light guide within the housing. Light refracted out of the light guide is then directed, or viewed, through a lens of the housing. Unfortunately, such light assemblies may require multiple light sources with multiple light guides to obtain the desired visual effect.

Accordingly, it is desirable to reduce the number of parts by reducing the number of light sources and/or light guides to obtain the same visual effect while reducing cost.

SUMMARY

A multi-branched light guide device according to one, non-limiting, embodiment of the present disclosure includes a first branch, a second branch, a third branch, and a trunk. The first branch is adapted to internally transmit a first portion of a plurality of light rays along a first direction, and includes an outer surface adapted to internally reflect the first portion in the first direction. The second branch is adapted to internally transmit a second portion of the plurality of light rays along a second direction, and includes an outer surface adapted to internally reflect the second portion in the second direction. The third branch is adapted to internally transmit a third portion of the plurality of light rays along a third direction, and includes an outer surface adapted to internally reflect the third portion in the third direction. The trunk is connected to the first, second, and third branches, and is adapted to internally transmit the plurality of light rays against the outer surfaces of the first, second and third branches.

In addition to the foregoing embodiment, the multi-branched light guide device includes a light source adapted to generate the plurality of light rays and transmit the plurality of light rays into the trunk.

In the alternative or additionally thereto, in the foregoing embodiment the first, second, and third branches, and the trunk are one unitary and homogeneous piece.

In the alternative or additionally thereto, in the foregoing embodiment, the multi-branched light guide device includes a reflective coating disposed upon at least one of the outer surfaces of the first, second, and third branches.

In the alternative or additionally thereto, in the foregoing embodiment, the first, second, and third branches are each elongated, each longitudinally extending along respective centerlines, and each including a base end portion attached to the trunk and carrying the respective outer surfaces of the first, second, and third branches.

In the alternative or additionally thereto, in the foregoing embodiment, the plurality of light rays are not refracted as the plurality of light rays travel from the trunk and into the base end portions of the first, second, and third branches.

In the alternative or additionally thereto, in the foregoing embodiment, the first, second, and third directions are generally parallel to first, second, and third centerlines of the respective first, second, and third branches.

In the alternative or additionally thereto, in the foregoing embodiment, the centerlines of the base end portions of the first, second, and third branches are angled with respect to a centerline of the trunk.

In the alternative or additionally thereto, in the foregoing embodiment, at least one of the first, second, and third branches include light features adapted to refract light out of the respective first, second, and third branches.

In the alternative or additionally thereto, in the foregoing embodiment, the outer surfaces of the first, second and third branches are planar.

In the alternative or additionally thereto, in the foregoing embodiment, the multi-branched light guide device includes a first transition region, a second transition region, and a third transition region. The first transition region is part of the base end portion of the first branch and the trunk, is axially aligned to the trunk and the first branch, and is arranged to shadow the outer surface of the first branch such that the first portion is internally transmitted through the first transition region prior to reflecting off of the outer surface of the first branch. The second transition region is part of the base end portion of the second branch and the trunk, is axially aligned to the trunk and the second branch, and is arranged to shadow the outer surface of the second branch such that the second portion is internally transmitted through the second transition region prior to reflecting off of the outer surface of the second branch. The third transition region is part of the base end portion of the third branch and the trunk, is axially aligned to the trunk and the third branch, and is arranged to shadow the outer surface of the third branch such that the third portion is internally transmitted through the third transition region prior to reflecting off of the outer surface of the third branch.

In the alternative or additionally thereto, in the foregoing embodiment, the third transition region is flanked by the first and second transition regions.

A light guide according to another, non-limiting, embodiment includes an elongated first branch, an elongated second branch, a trunk, a first transition region, and a second transition region. The elongated first branch extends along a first centerline, and is adapted to internally transmit a first portion of a plurality of light rays in a first direction along the first centerline. The first branch includes a first base end portion including a first outer surface adapted to internally reflect the first portion in the first direction, and wherein the first outer surface is planar. The elongated second branch extends along a second centerline, and is adapted to internally transmit a second portion of the plurality of light rays in a second direction along the second centerline. The second branch includes a second base end portion including a second outer surface adapted to internally reflect the second portion in the second direction, and wherein the second outer surface is planar. The trunk is connected to the first and second branches, and is adapted to internally transmit the plurality of light rays against the outer surfaces of the first and second branches. The first transition region is part of the first base end portion and the trunk, is axially aligned to the trunk and the first branch, and is arranged to be shadowed by the first outer surface such that the first portion is internally transmitted through the first transition region prior to reflecting off of the first outer surface. The second transition region is part of the second base end portion and the trunk, is axially aligned to the trunk and the second branch, and is arranged to be shadowed by the second outer surface such that the second portion is internally transmitted through the second transition region prior to reflecting off of the second outer surface.

Additionally to the foregoing embodiment, the first branch, the second branch, and the trunk are one unitary and homogeneous piece.

In the alternative or additionally thereto, in the foregoing embodiment, the light guide includes a reflective coating disposed upon at least one of the outer surfaces of the first, second, and third branches.

In the alternative or additionally thereto, in the foregoing embodiment, the first and second centerlines at the respective first and second base end portion are angled with respect to a centerline of the trunk.

In the alternative or additionally thereto, in the foregoing embodiment, at least one of the first and second branches include light features adapted to refract light out of the respective first and second branches.

A light assembly according to another, non-limiting, embodiment includes a housing, a lens, a multi-branched light guide device located between the housing and the lens. The multi-branched light guide device includes an elongated first branch, an elongated second branch, a trunk, a first transition region, a second transition region, and a light source. The elongated first branch extends along a first centerline, and is adapted to internally transmit a first portion of a plurality of light rays in a first direction along the first centerline. The first branch includes a first base end portion including a first outer surface adapted to internally reflect the first portion in the first direction. The elongated second branch extends along a second centerline, and is adapted to internally transmit a second portion of the plurality of light rays in a second direction along the second centerline. The second branch includes a second base end portion including a second outer surface adapted to internally reflect the second portion in the second direction. The trunk is connected to the first and second branches, and is adapted to internally transmit the plurality of light rays against the outer surfaces of the first and second branches. The first transition region is part of the first base end portion and the trunk, is axially aligned to the trunk and the first branch, and is arranged to be shadowed by the first outer surface such that the first portion is internally transmitted through the first transition region prior to reflecting off of the first outer surface. The second transition region is part of the second base end portion and the trunk, is axially aligned to the trunk and the second branch, and is arranged to be shadowed by the second outer surface such that the second portion is internally transmitted through the second transition region prior to reflecting off of the second outer surface. The light source is adapted to generate the plurality of light rays and emit the light rays into the trunk.

Additionally to the foregoing embodiment, the first and second outer surfaces are planar.

In the alternative or additionally thereto, in the foregoing embodiment, at least one of the first and second branches include light features adapted to refract light out of the respective first and second branches and through the lens.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
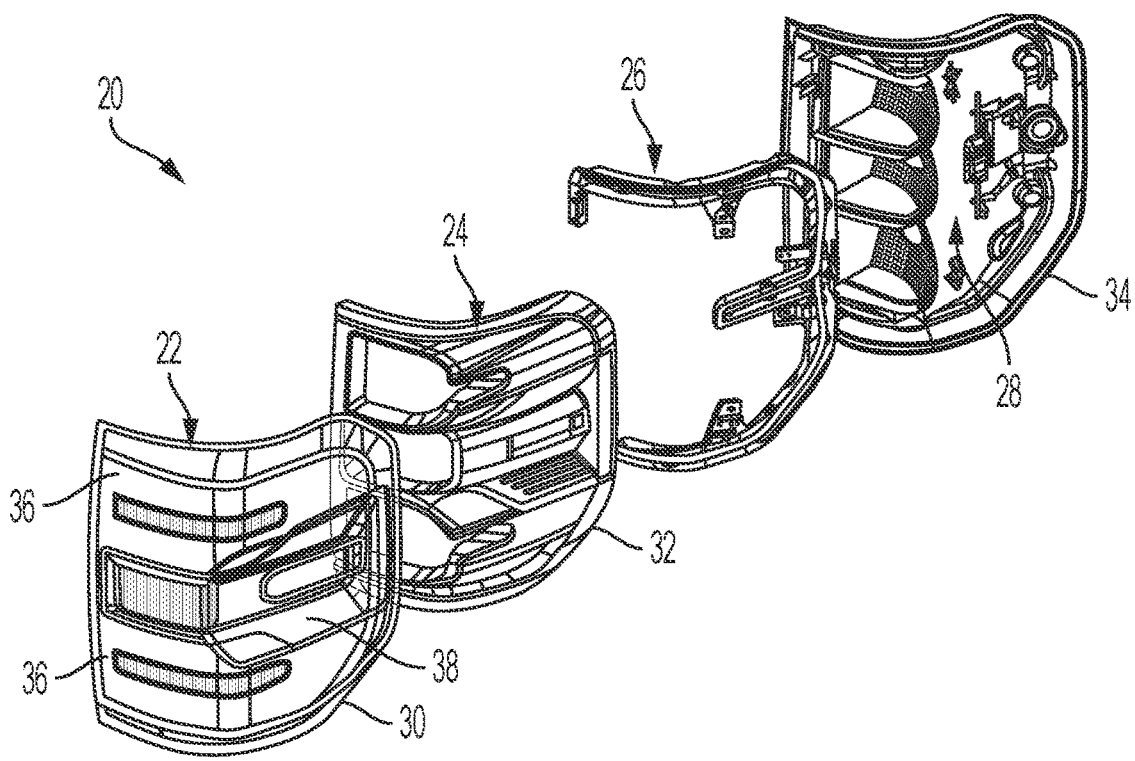
FIG. 1 is an unassembled, perspective, view of a light assembly utilizing a light guide device as one exemplary embodiment of the present disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a light assembly 20 is illustrated in FIG. 1. In one embodiment, the light assembly may be adapted for use in a vehicle (not shown). Non-limiting examples of the light assembly 20 may include a headlight assembly and a taillight assembly (as illustrated in FIG. 1).

In one embodiment, the light assembly 20 includes an outer lens 22, an inner lens 24, a multi-branched light guide device 26, and a housing 28. A cavity (not shown) is defined between the inner lens 24 and the housing 28. The multi-branched light guide device 26 is located in the cavity, and thus between the inner lens 24 and the housing 28. The outer lens 22, the inner lens 24, and the housing 28 include respective peripheral edges 30, 32, 34 engaged, or otherwise adhered to one-another to form the light assembly 20. In one embodiment, the peripheral edges 30, 32, 34 are circumferentially continuous.

The inner lens 24 is located between the outer lens 22 and the housing 28. In one example, the outer lens 22 includes at least one red, or red tinted portion 36, and at least one clear transparent portion 38. The inner lens 24 may be completely clear, or may be substantially clear with portions being blacked-out, or with black bezels.

Figure 2:
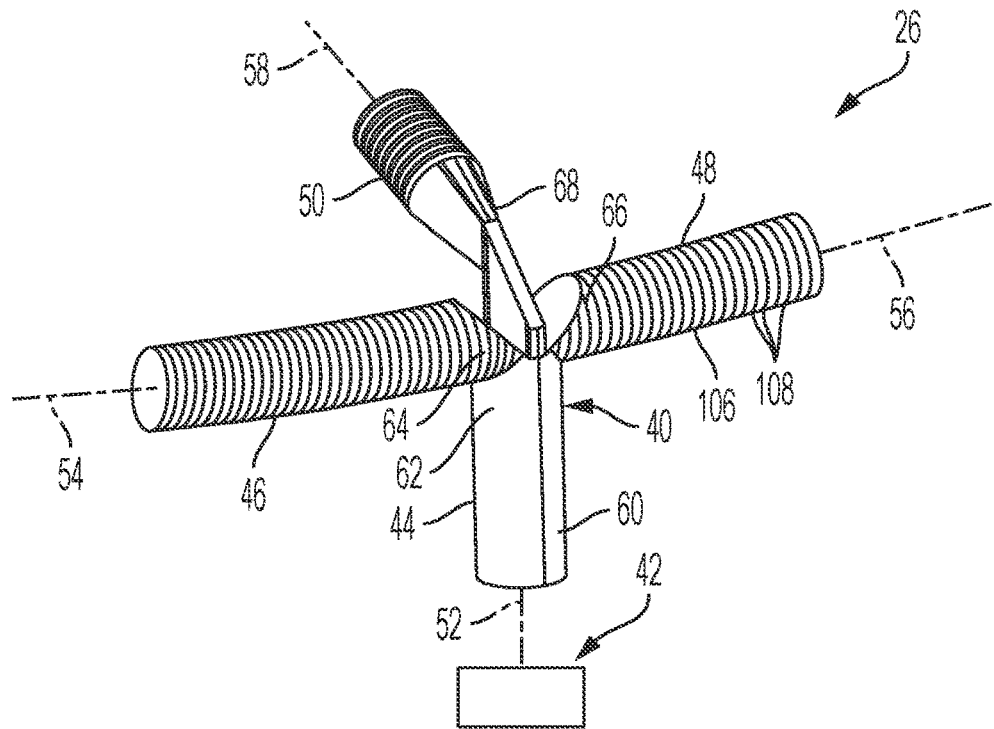
FIG. 2 is a partial perspective view of the light guide device.

Referring to FIGS. 1 and 2, the multi-branched light guide device 26 includes a light guide 40, and a light source 42. In one example, the light guide 40 is a multi-branched light guide that is one unitary, and homogeneous, piece made of a translucent optical polymer. Examples of a transparent polymer may include Polymethylmethacrylate (PMMA), Polycarbonate (PC), Cyclic Olefin co-polymer (COP), and any other suitable transparent polymers. The light guide 40 may be manufactured via a machining process, injection molding, additive manufacturing, and other processes, or combinations thereof.

In one example, the light guide 40 includes a trunk 44 and three branches 46, 48, 50, each being solid and constructed to transmit light internally. The trunk 44 and branches 46, 48, 50 may be elongated, each extending along respective centerlines 52, 54, 56, 58. The trunk 44 includes, and longitudinally extends between, opposite end segments 60, 62. The light source 42 is operatively engaged to the end segment 60, and base end portions 64, 66, 68 of the respective branches 46, 48, 50 are attached to the end segment 62 of the trunk 44. Each centerline 54, 56, 58 at the respective end portions 64, 66, 68 is angled with respect to each other and with respect to the centerline 52 at the end segment 62 of the trunk 44.

Figure 3:
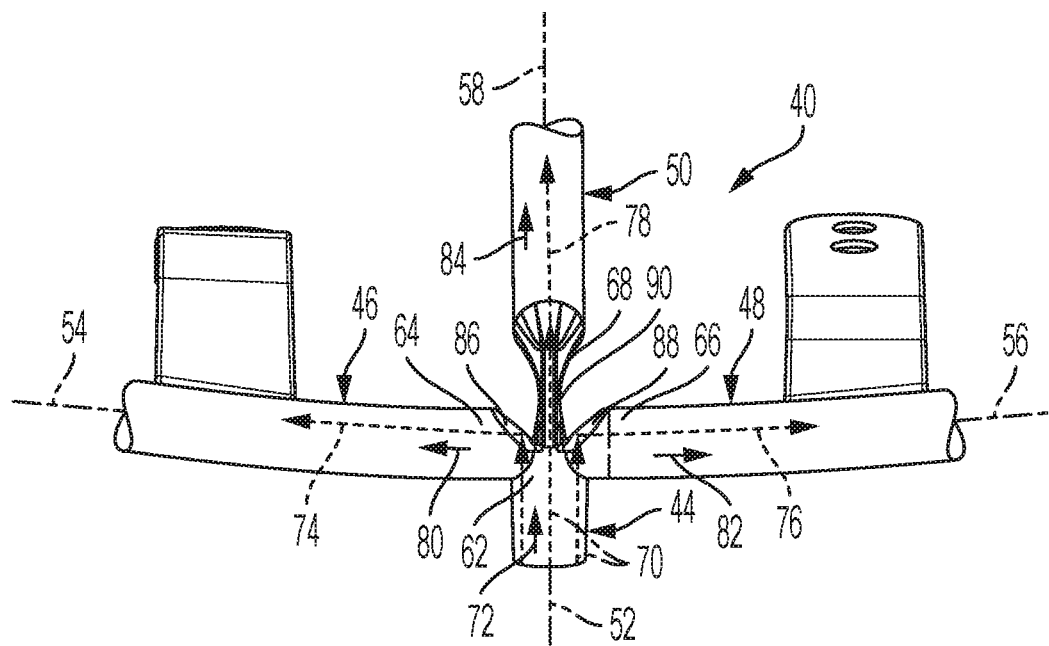
FIG. 3 is a partial perspective view of a light guide of the light guide device.
Figure 4:
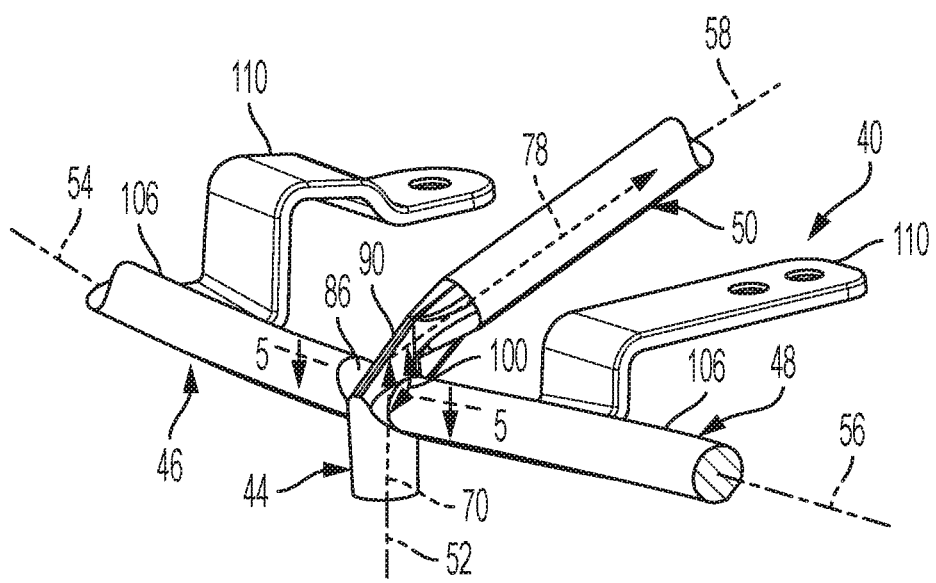
FIG. 4 is another partial perspective view of the light guide.

Referring to FIGS. 2 through 4, the light source 42 is configured to generate a plurality of light rays (see arrows 70 in FIG. 2), and emit the light rays 70 into the end segment 60 of the trunk 40. The light rays 70 are then internally transmitted generally in a first direction 72, and toward the opposite end segment 62. From the opposite end segment 62, the plurality of light rays 72 are separated into first, second, and third portions (see arrows 74, 76, 78 in FIG. 3) generally at the respective first, second, and third base end portions 64, 66, 68. At the end portions 64, 66, 68, the respective light ray portions 74, 76, 78 are internally reflected and toward respective directions (see arrows 80, 82, 84 in FIG. 3). In an example, the directions 72, 80, 82, 84 are substantially parallel to the respective centerlines 54, 56, 58. In one example, the branch 50 is substantially orthogonal to the branches 46, 48.

Figure 5:
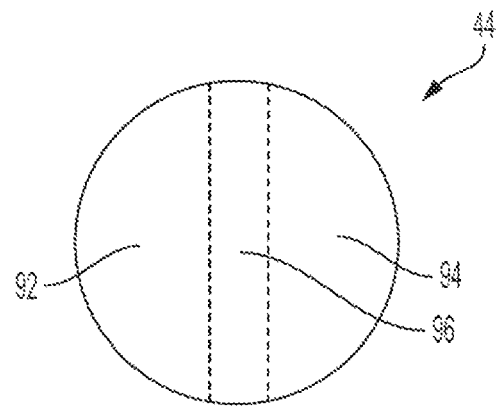
FIG. 5 is a cross section taken at an end segment of a trunk of the light guide and viewing in the direction of arrows 5-5 in FIG. 4.

Referring to FIGS. 3 and 5, to facilitate the internal reflections of light ray portions 74, 76, 78, and in the respective directions 80, 82, 84, each base end portion 64, 66, 68 includes, and carries, a respective outer surface 86, 88, 90. In addition, the light guide 40 includes transition regions 92, 94, 96. The transition region 92 is part of the base end portion 64 of the branch 46 and the end segment 62 of the trunk 44. The transition region 94 is part of the base end portion 66 of the branch 48 and the end segment 62 of the trunk 44. The transition region 96 is part of the base end portion 68 of the branch 50 and the end segment 62 of the trunk 44. More specifically, the transition regions 92, 94, 96 are unitary and homogeneous to both the trunk 44 and the respective branches 46, 48, 50. In this way, the light rays 70 are not refracted as they are internally transmitted from the trunk 44 to the branches 46, 48, 50. It is understood that the term "outer surface" means that the physical surface generally faces radially outward with respect to the respective branches 46, 48, 50. However, it is also understood that the same "outer surface" effectively internally reflects light rays.

The transition regions 92, 94, 96 are axially aligned to the trunk 44 and the respective branches 46, 48, 50, and are shadowed (or eclipsed) by the respective outer surfaces 86, 88, 90. That is, the portions 74, 76, 78 of the plurality of light rays 70 are generally, completely, transmitted through the respective transition regions 92, 94, 96 prior to the internal reflection off of the respective outer surfaces 86, 88, 90. Because the transition regions 92, 94, 96 are completely shadowed by the respective outer surfaces 86, 88, 90, all of the portions 74, 76, 78 of the plurality of light rays 70 passing through the respective regions 92, 94, 96 are completely reflected by the respective outer surface 86, 88, 90 for the efficient, internal, transmission of light.

Figure 6:
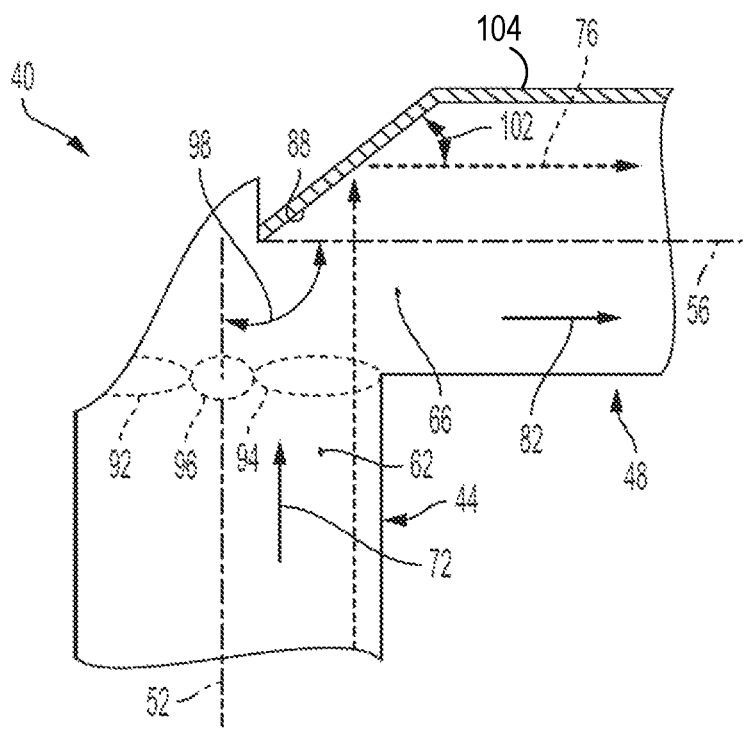
FIG. 6 is a partial cross section of the light guide illustrating a base end portion of a branch of the light guide and the end segment of the trunk.

Referring to FIG. 6, an angular relationship of the outer surface 88 with respect to the end segment 62 of the trunk 44 and the end portion 66 of the branch 48 is illustrated. It is also understood, that the angular relationships of the other outer surfaces 86, 90 may be similarly explained. The centerline 52 of the trunk 44 at the end segment 62 is at an angle (see arrow 98) with the centerline 56 of the branch 48 at the end portion 66. In one example, angle 98 is about ninety degrees (90°). In this same example, the angle between centerlines 74, 52 is at about ninety degrees but in an opposite direction to angle 98 (i.e., see opposite directions 80, 82). Also in the same example, the angle between centerlines 58, 52 is within a range of about one-hundred and ten degrees to about one-hundred and twenty degrees (110° to) 120°, see arrow 100 in FIG. 4.

With continued reference to FIG. 6, the ray portion 76 is internally reflected off of the surface 88 by an incident angle (see arrow 102). Incident angle 102 is therefore measured between the direction 82 of travel of the reflected portion 76 and the surface 88 that is substantially planar. For efficient transmission of light rays, the outer surface 88 is positioned such that the incident angle 102 is about half the angle 98. In one example, the transition region 96 is flanked by the transition regions 92, 94 (see FIG. 5). Similarly, the outer surface 90 is generally flanked by the outer surfaces 86, 88 (see FIG. 3).

In one embodiment, the light guide 40 may include a reflective coating 104 disposed on one or more of the outer surfaces 86, 88, 90 to optimize the reflective efficiency of the respective surface (see FIG. 6). In another example, the reflective coating(s) 104 may be disposed about the entire branches 46, 48, 50.

Referring again to FIG. 2, each branch 46, 48, 50 may include an outer face 106 in addition to the respective outer surfaces 86, 88, 90 (see FIG. 3). Unlike the outer surfaces 86, 88, 90, which are generally planar and smooth, the face 106 may define, or carries, light features 108 adapted to refract light out of the respective branch 46, 48, 50 for visual effect.

Referring to FIG. 4 and in one embodiment, the light guide 40 may include one or more brackets 110 that may generally project radially outward from the outer face 106 of the respective branches 46, 48. The brackets 110 are adapted to hold the light guide 40 in a predetermined position within, for example, the light assembly 20 (see FIG. 1). In one example, the brackets 110 are formed as one homogeneous and unitary piece to the remainder of the light guide 40.

Advantages and benefits of the present disclosure include a light guide 40 capable of splitting light into two or more directions while utilizing a single light source. This splitting of light facilitates a decrease in the number of light sources needed thus reducing light assembly complexity, the number of components, and cost.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A multi-branched light guide device comprising:
   a first branch adapted to internally transmit a first portion of a plurality of light rays along a first direction, the first branch including an outer surface adapted to internally reflect the first portion in the first direction;
   a second branch adapted to internally transmit a second portion of the plurality of light rays along a second direction, the second branch including an outer surface adapted to internally reflect the second portion in the second direction;
   a third branch adapted to internally transmit a third portion of the plurality of light rays along a third direction, the third branch including an outer surface adapted to internally reflect the third portion in the third direction;
   a trunk connected to the first, second, and third branches, and adapted to internally transmit the plurality of light rays along a centerline of the trunk, toward the first, second, and third branches, then against the outer surfaces of the first, second and third branches for dispersion of the plurality of light rays into the first, second and third portions;

wherein the first, second, and third branches are each elongated, each longitudinally extending along respective centerlines, and each including a base end portion attached to the trunk and carrying the respective outer surfaces of the first, second, and third branches, and wherein the outer surfaces of the first, second and third branches are planar;

a first transition region being part of the base end portion of the first branch and the trunk, axially aligned to the trunk and the first branch, and arranged to shadow the outer surface of the first branch such that the first portion is internally transmitted through the first transition region prior to reflecting off of the outer surface of the first branch;

a second transition region being part of the base end portion of the second branch and the trunk, axially aligned to the trunk and the second branch, and arranged to shadow the outer surface of the second branch such that the second portion is internally transmitted through the second transition region prior to reflecting off of the outer surface of the second branch; and a third transition region being part of the base end portion of the third branch and the trunk, axially aligned to the trunk and the third branch, and arranged to shadow the outer surface of the third branch such that the third portion is internally transmitted through the third transition region prior to reflecting off of the outer surface of the third branch.

2. The multi-branched light guide device set forth in claim 1, wherein the third transition region is flanked by the first and second transition regions.

3. A light guide comprising:

an elongated first branch extending along a first centerline and adapted to internally transmit a first portion of a plurality of light rays in a first direction along the first centerline, the first branch including a first base end portion including a first outer surface adapted to internally reflect the first portion in the first direction, wherein the first outer surface is planar;

an elongated second branch extending along a second centerline and adapted to internally transmit a second portion of the plurality of light rays in a second direction along the second centerline, the second branch including a second base end portion including a second outer surface adapted to internally reflect the second portion in the second direction, wherein the second outer surface is planar;

a trunk connected to the first and second branches, and adapted to internally transmit the plurality of light rays along a centerline of the trunk, toward the first and second branches, then against the outer surfaces of the first and second branches for dispersion of the plurality of light rays into the first and second and third base end portions;

a first transition region being part of the first base end portion and the trunk, axially aligned to the trunk and the first branch, and arranged to be shadowed by the first outer surface such that the first portion is internally transmitted through the first transition region prior to reflecting off of the first outer surface; and a second transition region being part of the second base end portion and the trunk, axially aligned to the trunk and the second branch, and arranged to be shadowed by the second outer surface such that the second portion is internally transmitted through the second transition region prior to reflecting off of the second outer surface.

4. The light guide set forth in claim 3, wherein the first branch, the second branch, and the trunk are one unitary and homogeneous piece.

5. The light guide set forth in claim 3, further comprising a reflective coating disposed upon at least one of the outer surfaces of the first, second, and third branches.

6. The light guide set forth in claim 3, wherein the first and second centerlines at the respective first and second base end portion are angled with respect to a centerline of the trunk.

7. The light guide set forth in claim 3, wherein at least one of the first and second branches include light features adapted to refract light out of the respective first and second branches.

8. A light assembly comprising:

a housing;

a lens engaged to the housing; and a multi-branched light guide device located between the housing and the lens, the multi-branched light guide device including;

an elongated first branch extending along a first centerline and adapted to internally transmit a first portion of a plurality of light rays in a first direction along the first centerline, the first branch including a first base end portion including a first outer surface adapted to internally reflect the first portion in the first direction, an elongated second branch extending along a second centerline and adapted to internally transmit a second portion of the plurality of light rays in a second direction along the second centerline, the second branch including a second base end portion including a second outer surface adapted to internally reflect the second portion in the second direction, a trunk connected to the first and second branches, and adapted to internally transmit the plurality of light rays along a centerline of the trunk, toward the first and second branches, then against the outer surfaces of the first and second branches for dispersion of the plurality of light rays into the first and second base end portions, a first transition region being part of the first base end portion and the trunk, axially aligned to the trunk and the first branch, and arranged to be shadowed by the first outer surface such that the first portion is internally transmitted through the first transition region prior to reflecting off of the first outer surface, a second transition region being part of the second base end portion and the trunk, axially aligned to the trunk and the second branch, and arranged to be shadowed by the second outer surface such that the second portion is internally transmitted through the second transition region prior to reflecting off of the second outer surface, and a light source adapted to generate the plurality of light rays and emit into the trunk.

9. The light assembly set forth in claim 8, wherein the first and second outer surfaces are planar.

10. The light assembly set forth in claim 8, wherein at least one of the first and second branches include light features adapted to refract light out of the respective first and second branches and through the lens.

* * * * *